(12) United States Patent
Bich et al.

(10) Patent No.: US 8,122,694 B2
(45) Date of Patent: Feb. 28, 2012

(54) SUSPENSION SYSTEM FOR A CROP HARVESTING HEADER

(75) Inventors: Gary Bich, New Holland, PA (US); Derek S. Rude, Muenster (CA); Robert Cropper, Humboldt (CA); Leslie G. Hill, Humboldt (CA)

(73) Assignee: CNH America LLC, New Holland, PA (US)

( * ) Notice: Subject to any disclaimer, the term of this patent is extended or adjusted under 35 U.S.C. 154(b) by 241 days.

(21) Appl. No.: 12/563,284

(22) Filed: Sep. 21, 2009

(65) Prior Publication Data

US 2011/0067373 A1 Mar. 24, 2011

(51) Int. Cl.
*A01D 34/00* (2006.01)

(52) U.S. Cl. ........................................................ 56/15.8

(58) Field of Classification Search .................. 56/15.8, 56/15.1, 366, 364
See application file for complete search history.

(56) References Cited

U.S. PATENT DOCUMENTS

| | | | | |
|---|---|---|---|---|
| 3,698,171 A | * | 10/1972 | Hecht | 56/331 |
| 3,731,470 A | * | 5/1973 | Cornish et al. | 56/10.4 |
| 3,908,345 A | | 9/1975 | Oni et al. | |
| 4,147,016 A | * | 4/1979 | Jensen et al. | 56/15.8 |
| 4,171,606 A | * | 10/1979 | Ziegler et al. | 56/10.2 E |
| 4,304,089 A | * | 12/1981 | Mescheryakov et al. | 56/364 |
| 4,414,792 A | | 11/1983 | Bettencourt et al. | |
| 4,463,546 A | | 8/1984 | Day | |
| 4,567,719 A | * | 2/1986 | Soots et al. | 56/364 |
| 4,573,124 A | | 2/1986 | Seiferling | |
| 4,930,801 A | | 6/1990 | Gillund | |
| 4,944,141 A | | 7/1990 | Orlando et al. | |
| 5,415,586 A | * | 5/1995 | Hanson et al. | 460/8 |
| 5,507,139 A | * | 4/1996 | Delperdang et al. | 56/366 |
| 5,566,535 A | * | 10/1996 | Pruitt | 56/15.1 |
| 5,784,867 A | | 7/1998 | McFarland et al. | |
| 6,199,355 B1 | * | 3/2001 | Stiefvater et al. | 56/14.9 |
| 6,212,865 B1 | * | 4/2001 | Peeters et al. | 56/366 |
| 6,381,937 B1 | * | 5/2002 | Nelson | 56/33 |
| 6,758,029 B2 | * | 7/2004 | Beaujot | 56/10.2 E |
| 6,789,379 B2 | | 9/2004 | Heidjann et al. | |
| 2007/0000226 A1 | * | 1/2007 | Grywacheski et al. | 56/364 |
| 2008/0058041 A1 | | 3/2008 | Phillips | |

* cited by examiner

*Primary Examiner* — Arpad Fabian-Kovacs
(74) *Attorney, Agent, or Firm* — Michael G. Harms

(57) ABSTRACT

A suspension system is provided for use with a crop harvesting header including a frame carrying a structure movable about an endless path to deliver a crop to the header. The frame has opposed ends and is pivotably connected to the header, each end of the frame being independently movable between a first angle between the frame and the header and a second angle between the frame and the header. A first suspension member and a second suspension member are each connected between the frame and the header to provide a substantially constant force to the frame between the first and second angles.

15 Claims, 3 Drawing Sheets

SUSPENSION SYSTEM FOR A CROP HARVESTING HEADER

FIELD OF THE INVENTION

The present invention relates generally to crop gathering devices. It relates more particularly to crop gathering devices for use with harvesting headers.

BACKGROUND OF THE INVENTION

Crop gathering devices for collecting crops arranged in windrows can include a belt positioned along the front of the device. The belt is driven to rotate between opposed pairs of roller assemblies to convey the crops into a header that is secured to an agricultural harvester, such as a combine which is directed along the windrow. One or more wheels is located near the belt opposite the header to maintain a spacing between the belt and the ground that most effectively conveys crops onto the belt.

During operation of the harvester, for reasons including uneven terrain and velocity of the harvester, the spacing between the belt and the ground can deviate from an optimum crop conveying position. In response, springs have been positioned between the crop gathering device and the header. While use of springs can help reduce such deviations, forces applied by the springs changes in response to changes in length of the springs (in accordance with Hooke's Law).

What is needed is a suspension system that provides a substantially constant force between the crop gathering device and the header over the range of movement between the crop gathering device and the header.

SUMMARY OF THE INVENTION

The present invention relates to a suspension system provided for use with a crop harvesting header including a frame carrying a structure movable about an endless path to deliver a crop to the header. The frame has opposed ends and is pivotably connected to the header, each end of the frame being independently movable between a first angle between the frame and the header and a second angle between the frame and the header. A first suspension member and a second suspension member are each connected between the frame and the header to provide a substantially constant force to the frame between the first and second angles.

The present invention further relates to a suspension system for use with a crop harvesting header including a frame carrying a belt movable about an endless path to deliver a crop to the header. The frame has opposed ends and is pivotably connected to the header, each end of the frame independently movable between a first angle between the frame and the header and a second angle between the frame and the header. A first hydraulic ram and a second hydraulic ram are each connected between the frame and the header to provide a substantially constant force to the frame between the first and second angles.

An advantage of the present invention is the application of a substantially constant force between the crop gathering device and the header over the range of movement between the crop gathering device and the header.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
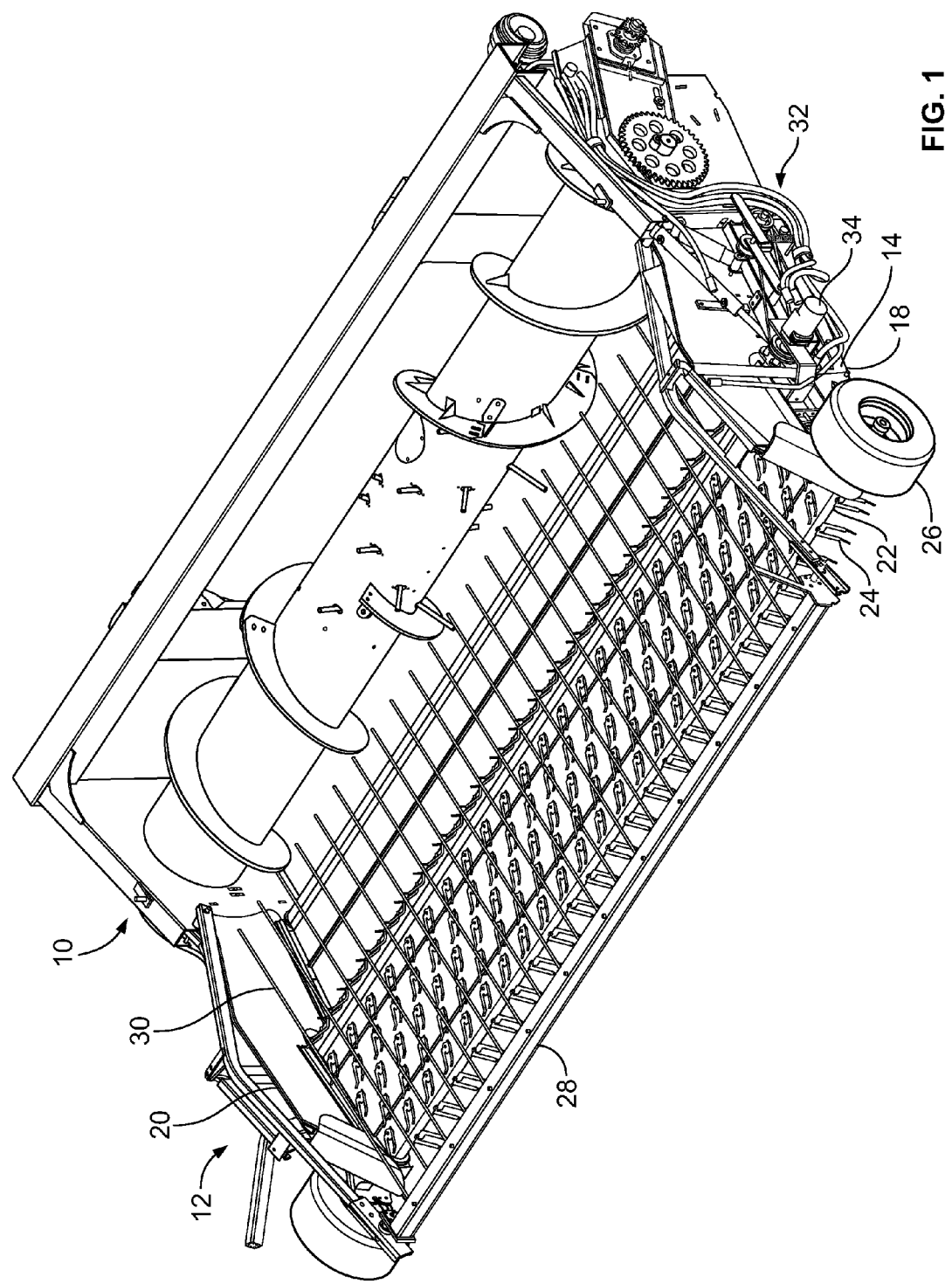
FIG. 1 is a top perspective view of an embodiment of a crop gathering device and harvesting header of the present invention.
Figure 2:
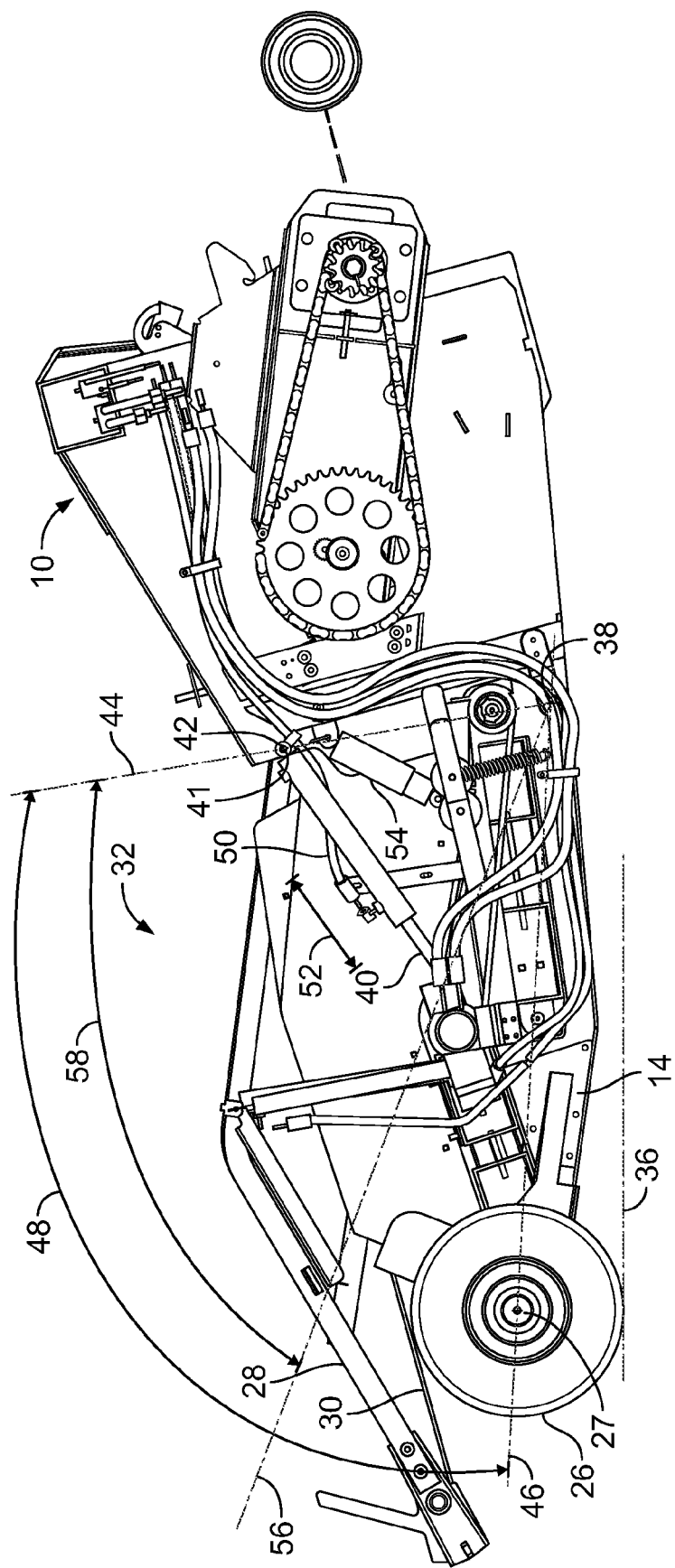
FIG. 2 is a side view of the crop gathering device of FIG. 1 (the crop conveying belt not shown) of the present invention.
Figure 3:
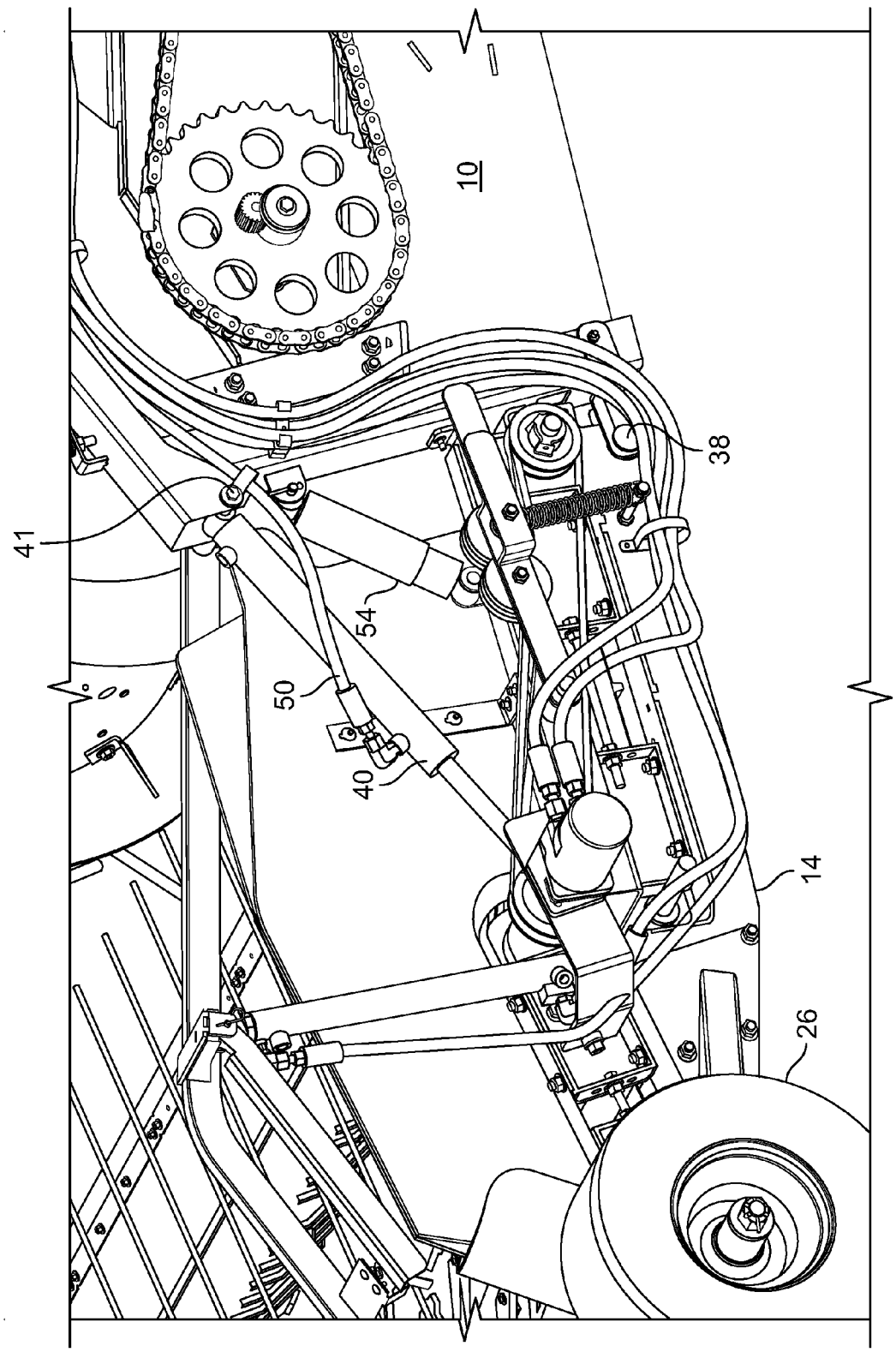
FIG. 3 is an enlarged, partial perspective view of the crop gathering device of FIG. 2 of the present invention.

FIGS. 1-3 show a crop gathering device 12 for use with a harvesting header 10. Harvesting header 10 may be secured to an agricultural vehicle such as a combine (not shown) as is known in the art and not further discussed. A frame 14 carries a structure 22 movable about an endless path to deliver a crop to harvesting header 10. In one embodiment, structure 22 is a belt, or multiple belts, that extends from one end 18 of frame 14 toward another end 20 of frame 14. Structure 22 may be driven about a set of parallel rollers (not shown) by a power source such as a hydraulic motor 34. Structure 22 may include a plurality of tines 24 or fork-like components extending outwardly from the structure to assist with collecting crops arranged in a windrow. Wheels 26 may be rotatably secured to or near respective ends 18, 20 of frame 14 opposite header 10 to maintain one end of structure 22 near the ground 36 to permit tines 24 of structure 22 to gather or collect crops arranged in the windrow. A guide 28 equipped with tines 30 may be positioned over structure 22 to more effectively feed crops from structure 22 to header 10.

Frame 14 may be pivotally connected with header 10 about a pivot 38 such as a pin. Without intending to limit the invention, several axes are provided to provide context for the pivotal movement between frame 14 and header 10. A pivot 42 is also formed in header 10, pivots 38, 42 defining an axis 44 of header 10. In an alternate embodiment, axis 44 corresponds to the edge of header 10. In one position of frame 14, such as when wheel 26 is in contact with ground 36, an axis 46 is defined by pivot 38 and the center 27 of wheel 26. An angle 48 is subtended by axes 44 and 46. In another position of frame 14, such as when wheel 26 is raised above and out of contact with ground 36, an axis 56 is defined by an upper position along frame 14 and pivot 38 and through center 27 of wheel 26. An angle 58 is subtended by axes 44 and 56.

A suspension member 40 is pivotably connected between frame 14 and header 10. As shown in FIG. 2, an end 41 of suspension member 40 coincides with pivot 42. Suspension member 40 also includes an end (not shown) opposite end 41 that is similarly pivotably connected to frame 14. Suspension member 40 is positioned near end 18 of frame 14, and an additional suspension member (not shown) is positioned near end 20 of frame 14 which functions in a manner similar to suspension member 40. In one embodiment, suspension member 40 is a hydraulic ram and receives hydraulic fluid via a connection with a line 50 provided with a hydraulic accumulator (not shown). Suspension member 40 is included as part of a suspension system 32.

During operation of crop gathering device 12, in which wheel 26 is in contact with ground 36, suspension member 40 is in an extended position, due to a pressurized fluid connection via the hydraulic accumulator, providing a substantially constant force to frame 14 and header 10. That is, suspension member 40 outwardly extends along its length in direction 52. However, during further operation of crop gathering device 12, during which wheel 26 is moved to a position that is above ground 36 (such as by striking an obstacle in the field) resulting in center 27 of wheel 26 coinciding with axis 56 (in one instance), suspension member 40 is in a contracted position, yet continuing to provide a substantially constant force to frame 14 and header 10, by virtue of the operation of the hydraulic accumulator. That is, suspension member 40 inwardly contracts along its length in direction 52. In other words, over the range of angular movement between angles 48 and 58 during operation of crop gathering device 12, suspension member 40 provides a substantially constant force to frame 14 and header 10, while permitting the length of suspension member 40 to change.

Optionally, a resilient device 54, such as a spring may be used in combination with suspension member 40, which may decrease the amount of force that is desirable for suspension member 40 to provide to frame 14 and header 10. As shown in the figures, the distance between the respective pivot points corresponding to the opposed ends of resilient device 54 and corresponding positions of frame 14 and header 10 from pivot 38 is less than the distance between the respective pivot points corresponding to the opposed ends of suspension member 40 and pivot 38. That is, in one embodiment, the change in length of resilient device 54 will be less than the change of length of suspension member 40, in response to a change in angle between frame 14 and header 10. By reducing the change in length of resilient device 54, a change in force in accordance with Hooke's Law for the resilient device is reduced.

While an exemplary embodiment as shown in FIG. 3 is representative of a suspension member 40 having a one-way valve arrangement via line 50 with an accumulator, resulting in a lowering force, it is to be understood that with alternate embodiments providing a two-way valve arrangement such as with multiple lines in fluid communication with accumulator(s), the substantially constant force provided by suspension member 40 may be either a lifting force or a lowering force, depending upon the application of use of the harvesting device. That is, a lifting force would reduce the amount of force wheels 26 apply to ground 36, while a lowering force would increase the amount of force wheels 26 apply to ground 36.

In one embodiment, the magnitude of the substantially constant force provided by suspension member 40 is adjustable. In an exemplary embodiment, such adjustment capability may be added by adjusting or changing hydraulic pressure in the system. In a further exemplary embodiment, such adjustment capability may be added by changing the accumulator pressure. In another embodiment, the magnitude adjustment of suspension member 40 may be achieved from a position remote from the suspension member such as from a cab of a crop harvesting machine.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A suspension system for use with a crop harvesting header comprising:
    a frame carrying a structure movable about an endless path to deliver a crop to the header, the frame having opposed ends, the opposed ends are pivotably connected to a lower portion of the header at a first pivot and the opposed ends are further pivotally connected to an upper portion of the header at a second pivot, the first and second pivots are substantially aligned along a common substantially vertical axis, each end of the frame independently movable between a first angle between the frame and the header and a second angle between the frame and the header; and
    a first suspension member and a second suspension member, each suspension member connected between the frame and the header to provide a substantially constant force to the frame between the first and second angles, wherein the first suspension member has one end fixed at the second pivot point and further wherein the second suspension member has an end substantially aligned with the axis.

2. The system of claim 1, wherein the substantially constant force is a lifting force.

3. The system of claim 1, wherein the substantially constant force is a lowering force.

4. The system of claim 1, wherein structure is a belt.

5. The system of claim 4, wherein the belt includes tines extending outwardly from the belt.

6. The system of claim 1, wherein the first suspension member and the second suspension member are each hydraulic rams.

7. The system of claim 6, wherein a magnitude of the substantially constant force provided by the first suspension member and the second suspension member is adjustable.

8. The system of claim 7, wherein magnitude adjustment of the first suspension member and the second suspension member may be achieved from a position remote from the first suspension member and the second suspension member.

9. The system of claim 8, wherein the remote position is from a cab of a crop harvesting machine used to support the header.

10. The system of claim 1, wherein the frame includes a support wheel.

11. The system of claim 10, wherein the support wheel is positioned near an end of the frame opposite the header.

12. A suspension system for use with a crop harvesting header comprising:
    a frame carrying a belt movable about an endless path to deliver a crop to the header, the frame having opposed ends, the opposed ends are pivotably connected to a lower portion of the header at a first pivot and the opposed ends are further pivotally connected to an upper portion of the header at a second pivot, the first and second pivots are substantially aligned along a common substantially vertical axis, each end of the frame independently movable between a first angle between the frame and the header and a second angle between the frame and the header; and
    a first hydraulic ram and a second hydraulic ram, each hydraulic ram connected between the frame and the header to provide a substantially constant force to the frame between the first and second angles, wherein the first hydraulic ram has one end fixed at the second pivot point and further wherein the second hydraulic ram has an end substantially aligned with the axis.

13. The system of claim 12, wherein a magnitude of the substantially constant force provided by the first hydraulic ram and the second hydraulic ram is adjustable.

14. The system of claim 12, wherein the substantially constant force is a lifting force.

15. The system of claim 12, wherein the substantially constant force is a lowering force.

* * * * *